United States Patent [19]

Misu

[11] Patent Number: 5,426,695
[45] Date of Patent: Jun. 20, 1995

[54] RINGING SIGNAL CONTROL CIRCUIT CAPABLE OF SUPPRESSING SURGE VOLTAGE

[75] Inventor: Keiichi Misu, Kawasaki, Japan

[73] Assignee: Nitsuko Corporation, Kawasaki, Japan

[21] Appl. No.: 142,790

[22] Filed: Oct. 25, 1993

[30] Foreign Application Priority Data

Oct. 26, 1992 [JP] Japan .................... 4-287509

[51] Int. Cl.$^6$ ............................................. H04M 3/02
[52] U.S. Cl. .................... 379/252; 379/418; 379/377; 379/382; 379/256
[58] Field of Search ................ 379/252, 250, 253, 254, 379/256, 382, 377, 386, 418

[56] References Cited

U.S. PATENT DOCUMENTS

| | | | |
|---|---|---|---|
| 4,734,936 | 3/1988 | Tanaka et al. | 379/253 |
| 5,216,708 | 3/1993 | Furukawa et al. | 379/254 |
| 5,293,420 | 3/1994 | Nagato | 379/253 |

FOREIGN PATENT DOCUMENTS

5-207136  8/1993  Japan .

*Primary Examiner*—James L. Dwyer
*Assistant Examiner*—Scott Wolinsky
*Attorney, Agent, or Firm*—Frishauf, Holtz, Goodman & Woodward

[57] ABSTRACT

In a ringing signal control circuit for controlling supply of a ringing signal from a ringing signal generator to a subscriber's line in response to a call signal destined thereto, a switching element is repeatedly switched to connect the ringing signal generator to the subscriber's line under control of a switching signal from a switch controller. In order to suppress a surge voltage due to connection and disconnection of the subscriber's line for the ringing signal generator, a memory stores a time data signal representative of a transition time from a reference voltage level to an optimum voltage level for the subscriber's line. The optimum voltage level is the level at which the connection and disconnection can be carried out without generation of the surge voltage. A voltage comparator compares the ringing signal with the reference voltage to produce a coincident signal. The switch controller receives the coincident signal and reads the time data signal to produce the switching signal at a time delay of the transition time so that the connection and disconnection of the subscriber's line for the ringing signal generator are carried out at the optimum voltage level of the ringing signal.

8 Claims, 5 Drawing Sheets

RINGING SIGNAL CONTROL CIRCUIT CAPABLE OF SUPPRESSING SURGE VOLTAGE

BACKGROUND OF THE INVENTION

This invention relates to a telecommunication system including a plurality of terminal sets, a plurality of subscriber's line circuits, a plurality of subscriber's lines connecting the terminal sets with the subscriber's line circuits corresponding thereto, and a ringing signal generator for generating a ringing signal which is supplied to a particular one of the subscriber's lines upon reception of a call signal destined to the particular subscriber's line, and more particularly, to a ringing signal control circuit in the telecommunication system for controlling supply of the ringing signal to the particular subscriber's line.

Generally speaking, a telecommunication network system comprises exchanging stations such as exchanging office stations at nodes in a public telephone network and private exchanging stations or key telephone apparatus at network terminals. Each of these stations accommodates a plurality of subscriber's lines which extend to terminal sets such as telephone sets, facsimile sets, or the like, and station lines which extend to other stations. These lines will be referred to as subscriber's lines.

Each station includes subscriber's line circuits which are connected to the subscriber's lines, respectively, and a ringing signal control circuit for supplying a ringing signal to a particular one of the subscriber's lines when a particular one of the subscriber's line circuits receives a call signal destined to the particular subscriber's line to produce a call detection signal.

A conventional ringing signal controlling circuit comprises a ringing signal generator which generates the ringing signal in response to the call detection signal from any one of the subscriber's line circuits. The ringing signal cyclically changes in its voltage level between a maximum and a minimum voltage level with a frequency.

A switch control circuit generally starts upon receipt of the call detection signal and generates and maintains the switching signal during a predetermined time period, for example, one second which is so called a make period. The make period is followed by a pause period of, for example, two seconds. The switching signal is repeatedly generated with the pause period between one and the next successive make periods.

A plurality of switching elements are provided to connect the subscriber's lines to the subscriber's line circuits, respectively, and to connect the subscriber's lines to the ringing signal generator, respectively. Each one of the switching elements has a first switching mode in absence of a switching signal and a second switching mode in presence of the switching signal.

Each of the switching elements connects the corresponding one of the subscriber's line circuits to the corresponding one of the subscriber's line and disconnects the ringing signal generator from the corresponding subscriber's line during the first switching mode. Each of the switching elements is responsive to the switching signal for connecting the ringing signal generator to the corresponding subscriber's line and disconnects the corresponding subscriber's line circuit from the corresponding subscriber's line during the second switching mode.

Thus, when the particular subscriber's line circuit detects the call signal destined to the particular subscriber's line, the ringing signal is repeatedly supplied to the particular subscriber's line with the pause period between one make period and the next succeeding make period.

When a handset is lifted up at a particular one of the terminal sets connected to the particular subscriber's line, the particular subscriber's line circuit detects an off-hook signal from the particular terminal set through the particular subscriber's line during the pause period. Then, the particular subscriber's line circuit produces a stop signal. Responsive to the stop signal, the ringing singal generator and the switching control circuit stop operation.

In the conventional ringing signal control circuit, it will be noted that switching operation of the switching element is carried out in no relation to the voltage level of the ringing signal. However, the present inventor discovered a problem that a surge voltage was often caused on the subscriber's line when the subscriber's line was connected to, and disconnected from, the ringing signal generator. The surge voltage adversely affects, as a noise signal, to other subscriber's lines.

It was also found out that the surge voltage was not caused when the connection and disconnection of the subscriber's line to the ringing signal generator was carried out at a specific voltage level of the ringing signal. The specific voltage level is determined by properties of the subscriber's line and the terminal set connected to the subscriber's line.

Accordingly, the inventor previously proposed an improved ringing signal control circuit in a prior Japanese patent application No. 38657/1992 filed on Jan. 29, 1992 which was published on Aug. 13, 1993 under Publication No. JP-A-5 207136.

The proposed ringing signal control circuit is additionally provided with a reference voltage producing circuit for producing a reference voltage selected equal to the specific voltage level, and a voltage comparator for comparing the ringing signal with the reference voltage to produce a coincident signal when the ringing signal coincides with reference voltage in voltage level. After receiving the call detection signal, the switch control circuit produces the ringing signal in response to the coincident signal from the voltage comparator. Thereafter, when receiving the coincident signal after the make period, the switch control circuit stops the ringing signal. Thereafter, when receiving the coincident signal after the pause period, the switch control circuit again produces the ringing signal. These operations are repeated until receiving the stop signal from the subscriber's line circuit.

In the previously proposed ringing signal control circuit, the surge voltage is effectively suppressed on a particular one of the subscriber's lines which has the specific or optimum voltage level equal to the reference voltage level. However, the surge voltage is still caused on another subscriber's line having an optimum voltage level different from the reference voltage.

In order to resolve the problem, there is a method to provide a plurality of pairs of the reference voltage producing circuit and the voltage comparator for the subscriber's lines. However, the method makes the ringing signal control circuit expensive.

SUMMARY OF THE INVENTION

Therefore, it is an object of this invention to provide an economical ringing signal control circuit which is capable of suppressing the surge voltage on each of subscriber's lines without use of a plurality of pairs of the reference voltage producing circuit and the voltage comparator for the subscriber's lines but with use of a memory and a single pair of a reference voltage producing circuit and a voltage comparator for the subscriber's lines.

This invention is applicable to a ringing signal control circuit for controlling supply of a ringing signal to a subscriber's line extended to a terminal set when a subscriber's line circuit corresponding to the subscriber's line receives a call signal destined to the subscriber's line to produce a call detection signal in a telephone system. The ringing signal control circuit according to this invention comprises: ringing signal generating means connected to the subscriber's line circuit and responsive to the call detection signal for generating the ringing signal, the ringing signal having a maximum voltage level and a minimum voltage level and cyclically changing in its voltage level between the maximum and the minimum voltage level; reference voltage producing means for producing a reference voltage with a predetermined voltage level which is lower than the maximum voltage level but higher than the minimum level; voltage comparing means connected to the ringing signal generating means and the reference voltage producing means for comparing the ringing signal with the reference voltage to produce a coincident signal when the ringing signal coincides with the reference voltage in voltage level; switching means coupled to the subscriber's line, the subscriber's line circuit, the ringing signals generating means and having a first switching mode in absence of a switching signal and a second switching mode in presence of the switching signal, the switching means connecting the subscriber's line to the subscriber's line circuit and disconnecting the ringing signal generating means from the subscriber's line in the first switching mode, the switching means being responsive to the switching signal and connecting the ringing signal generating means to the subscriber's line and disconnecting the subscriber's line circuit from the subscriber's line in the second switching mode; memory means for memorizing a time data signal representative of a voltage level transition time of the ringing signal from the predetermined voltage level to a specific voltage level which is determined by properties of the subscriber's line and the terminal set to be connected to the subscriber's line; and switch control means coupled with the voltage comparing means, the memory means, and the switching means for controlling the switching means, the switch control means starting control operation for controlling the switching means in response to the call detection signal from the subscriber's line circuit, the control operation comprising reading the time data signal from the memory means, deciding reception of the coincident signal from the voltage comparing means, and producing the switching signal at a time delayed by the voltage level transition time from reception of the coincident signal.

The control operation of the switch control means further has a first operation mode and a second operation mode which are repeated one after another until receiving the stop signal from the subscriber's line circuit, the switch control means, during the first operation mode, maintaining the switching signal for at least a first predetermined time period and deciding reception of the coincident signal after the first predetermined time period to stop the switching signal at a time delayed by the voltage level transition time from reception of the coincident signal, and the switch control means, during the second operation mode, maintaining stop of the switching signal for at least a second predetermined time period and deciding reception of the coincident signal after the second predetermined time period to again produce the switching signal at a time delayed by the voltage level transition time from reception of the coincident signal, the switch control means deciding whether or not the subscriber's line circuit produces the stop signal during the second predetermined time period to stop the control operation in response to the stop signal.

DESCRIPTION OF PREFERRED EMBODIMENT

Figure 1:
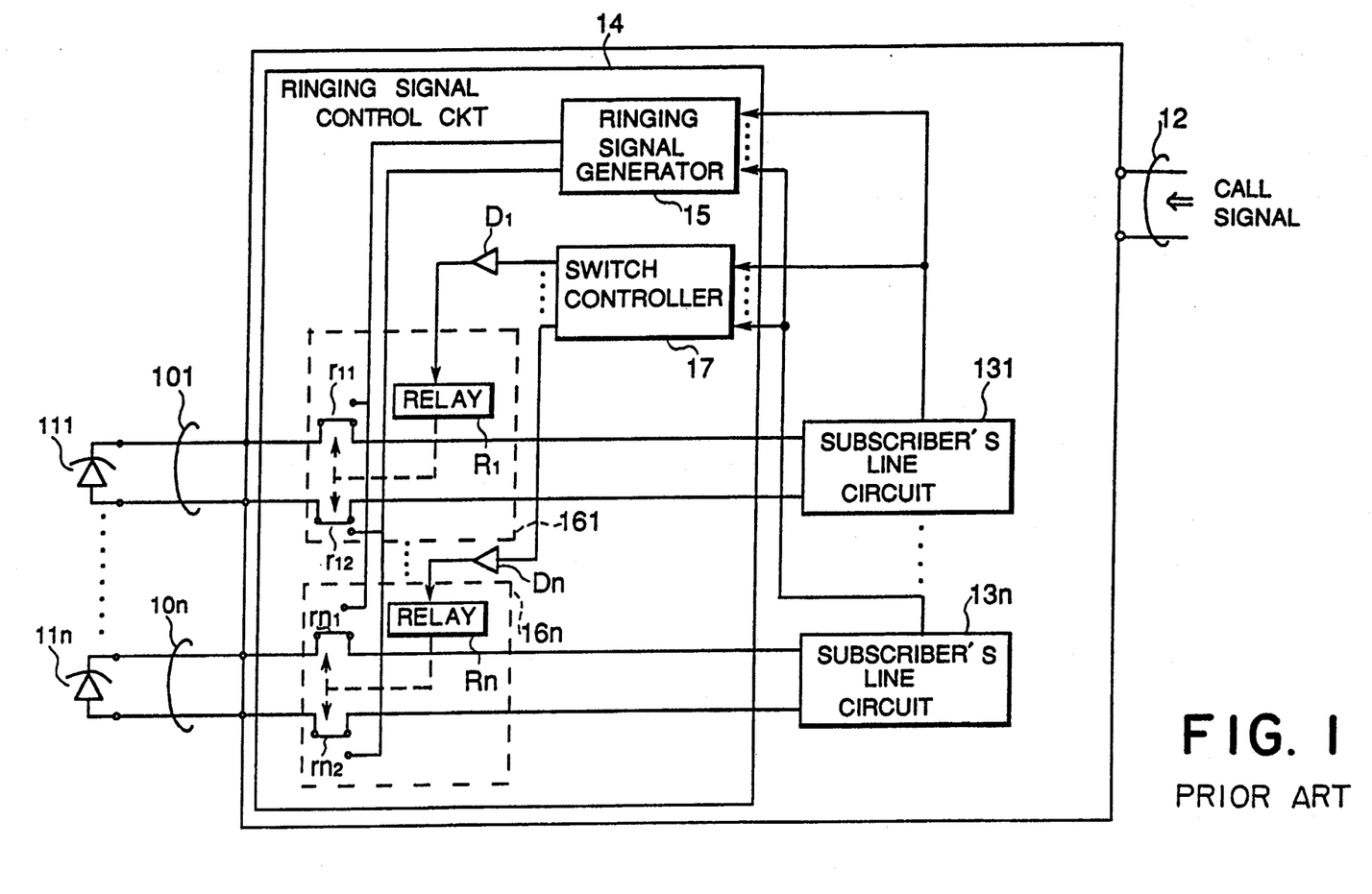
FIG. 1 is a block diagram view of an exchanging station accommodating a plurality of subscriber's lines and having a conventional ringing signal control circuit.

Referring to FIG. 1, a conventional ringing signal control circuit will be described in order to facilitate an understanding of the present invention.

In FIG. 1, an exchanging station is shown which accommodates a plurality of subscriber's lines 101 to 10n which extend to terminal sets 111 to 11n such as telephone sets, facsimile sets, or the like, and a plurality of station lines (one of which is shown at 12) which extend to other stations (not shown). The exchanging station includes subscriber's line circuits 131 to 13n which are connected to the subscriber's lines 101 to 10n, respectively. Each of the subscriber's line circuits 131 to 13n has a call detection function for detecting a call signal destined to a corresponding of the subscriber's lines 101 to 10n through another of the subscriber's lines 101 to 10n and the station lines 12 to produce a call detection signal.

Hereinafter, any one or a particular one of the subscriber's lines 101 to 10n, any one or a particular one of the terminal sets 111 to 11n, and any one or a particular one of the subscriber's line circuits 131 to 13n will often be identified by 10, 11, and 13, respectively.

The exchanging station has a ringing signal control circuit 14. The ringing signal control circuit 14 receives the call detection signal from any one or a particular one of the subscriber's line circuits 131 to 13n and supplies a ringing signal to a particular one of the subscriber's lines 101 to 10n which is connected to the particular subscriber's line circuit 13 which produced the call detection signal.

A conventional ringing signal control circuit 14 comprises a ringing signal generator 15 connected to the subscriber's line circuits 131 to 13n. The ringing signal generator 15 is responsive to the call detection signal and generates the ringing signal.

The ringing signal has an effective voltage of, for example, 75 V, with a maximum voltage level and a minimum voltage level and cyclically changes in its voltage level between the maximum and the minimum voltage levels. The ringing signal is generally a sinusoidal AC current of 15–20 Hz which is superimposed on a DC current of, for example, −48 V.

The ringing signal control circuit 14 further includes a plurality of switching elements 161 to 16n which are provided to connect the subscriber's lines 101 to 10n to the subscriber's line circuits 131 to 13n, respectively, and to connect the subscriber's lines 101 to 10n to the ringing signal generator 15, respectively. Each of the switching elements 161 to 16n has a first switching mode in absence of a switching signal and a second switching mode in presence of the switching signal. Each of the switching elements 161 to 16n connects each of the subscriber's line circuits 131 to 13n to each of the subscriber's lines 101 to 10n and disconnects the ringing signal generator 15 from each of the subscriber's lines 101 to 10n in the first switching mode. Each of the switching elements 161 to 16n is responsive to the switching signal supplied thereto and connects the ringing signal generator 15 to each of the subscriber's lines 101 to 10n and disconnects each of the subscriber's lines circuits 131 to 13n from each of the subscriber's lines 101 to 10n in the second switching mode.

Hereinafter, any one or a particular one of the switching elements 161 to 16n will often be identified by 16.

Generally, each of the switching elements 161 to 16n is a relay R1-Rn having relay contacts r11 and r12 to rn1 and rn2. In the first switching mode, the subscriber's lines 101 to 10n are connected to the subscriber's line circuits 131 to 13n through relay contacts r11 and r12 to rn1 and rn2, respectively. In the second switching mode, the subscriber's lines 101 to 10n are connected to the ringing signal generator 15 through relay contacts r11 and r12 to rn1 and rn2 which are brought into a make condition in response to the switching signal supplied to the relays R1 to Rn, respectively. At the same time, the subscriber's line circuits 131 to 13n are switched off or disconnected from the subscriber's lines 101 to 10n, respectively.

A switch control circuit 17 is connected to the subscriber's line circuits 131 to 13n and the switching elements 161 to 16n through diodes D1 to Dn. The switch control circuit 17 is responsive to the call detection signal from the particular subscriber's line circuit 13 and produces the switching signal to deliver it to a particular one of the switching elements 161 to 16n corresponding to the particular subscriber's line 10. Thus, the particular switching element 16 disconnects the particular subscriber's line circuit 13 from the particular subscriber's line 10 and connects the ringing signal generator 15 to the particular subscriber's line 10.

The switch control circuit 17 generally starts upon receipt of the call detection signal and generates and maintains the switching signal during a predetermined time period, for example, one second which is so called a make period Tm. The make period Tm is followed by a pause period Tp of, for example, two seconds. The switching signal is repeatedly generated with the pause period Tp between one and the next succeeding make periods Tm.

When a handset is lifted up at a particular one of the terminal sets 111 to 11n connected to the particular subscriber's line 10, the particular subscriber's line circuit 13 detects an off-hook signal from the particular terminal set 11 through the particular subscriber's line 10 during the pause period. Then, the particular subscriber's line circuit 13 produces a stop signal. Responsive to the stop signal, the ringing signal generator 15 and the switch control circuit 17 stop operation.

In the exchanging station using the conventional ringing signal control circuit, the surge voltage is often caused on the subscriber's line 10 at an instant time when the switching element 16 is switched to connect the subscriber's line 10 to the ringing signal generator 15, or to disconnect the subscriber's line 10 from the ringing signal generator 15, as described in the preamble.

Figure 2:
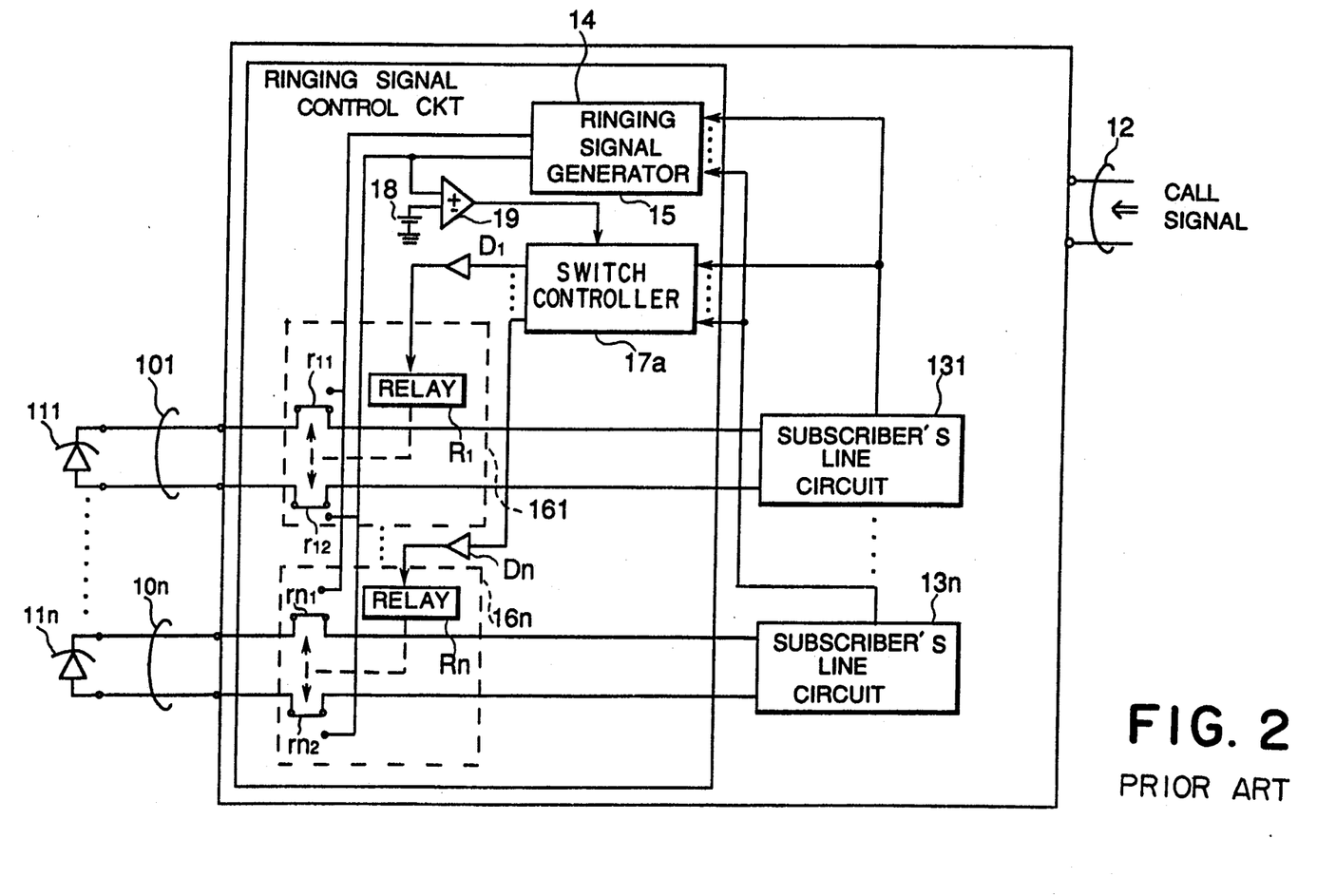
FIG. 2 is a block diagram view of an exchanging station accommodating a plurality of subscriber's lines and having a ringing signal control circuit which was previously proposed by the present inventor.

Referring to FIG. 2, there is shown another exchanging station using the ringing signal control circuit which was proposed in JP-A-5 207136.

The exchanging station in FIG. 2 is similar to that shown in FIG. 1, except for the function of a switch control circuit 17a and provision of a reference voltage source 18 and a voltage comparator 19. Similar portions are identified by the same reference symbols in FIG. 1 and description thereto is omitted for the purpose of simplification of the description.

The reference voltage source 18 produces a reference voltage with a predetermined voltage level which is lower than the maximum voltage level but higher than the minimum level of the ringing signal.

The reference voltage is determined to be an optimum voltage level for the subscriber's line 10. That is, the present inventor found out that the surge voltage is not caused on the subscriber's line 10 when the switching element 16 switches the subscriber's line 10 from the subscriber's line circuit 13 to the ringing signal generator 15 or from the ringing signal generator 15 to the subscriber's line circuit 13 at a specific voltage level of the ringing signal. The optimum voltage level is the specific voltage level. The optimum voltage level is determined by the subscriber's line properties such as the line length and properties of the terminal set connected to the subscriber's line.

The voltage comparator 19 is connected to the ringing signal generator 15 and the reference voltage source 18, and compares the ringing signal with the reference voltage to produce a coincident signal when the ringing signal coincides with the reference voltage in voltage level.

The switch control circuit 17a is responsive to the coincident signal after reception of the call detection signal from the particular subscriber's line circuit 13, and produces the switching signal. Thereafter, when the switch control circuit 17a receives the coincident signal from the voltage comparator 19 just after termination of the make period Tm, the switch control circuit 17a stops the switching signal. Thereafter, the switch control circuit 17a again produces the switching signal at reception of the coincident signal from the voltage comparator 19 after termination of the pause period Tp. The switch control circuit 17a repeats the above-described operation until receiving the stop signal from the particular subscriber's line circuit 10.

When the reference voltage is determined to be the optimum voltage level for one of the subscriber's lines, for example, the subscriber's line 101, the surge voltage is suppressed on the subscriber's line 101 when the switching element 161 switches the subscriber's line from the subscriber's line circuit 131 to the ringing signal generator 15 or from the ringing signal generator 15 to the subscriber's line circuit 131. However, when the other subscriber's line, for example, the subscriber's line 10n is different from the subscriber's line 101 in the line properties, for example, length of the line, the surge voltage is unfortunately caused on the subscriber's line 10n at an instant time when the switching element 16n switches the subscriber's line from the subscriber's line circuit 13n to the ringing signal generator 15 or from the ringing signal generator 15 to the subscriber's line circuit 13n.

Figure 3:
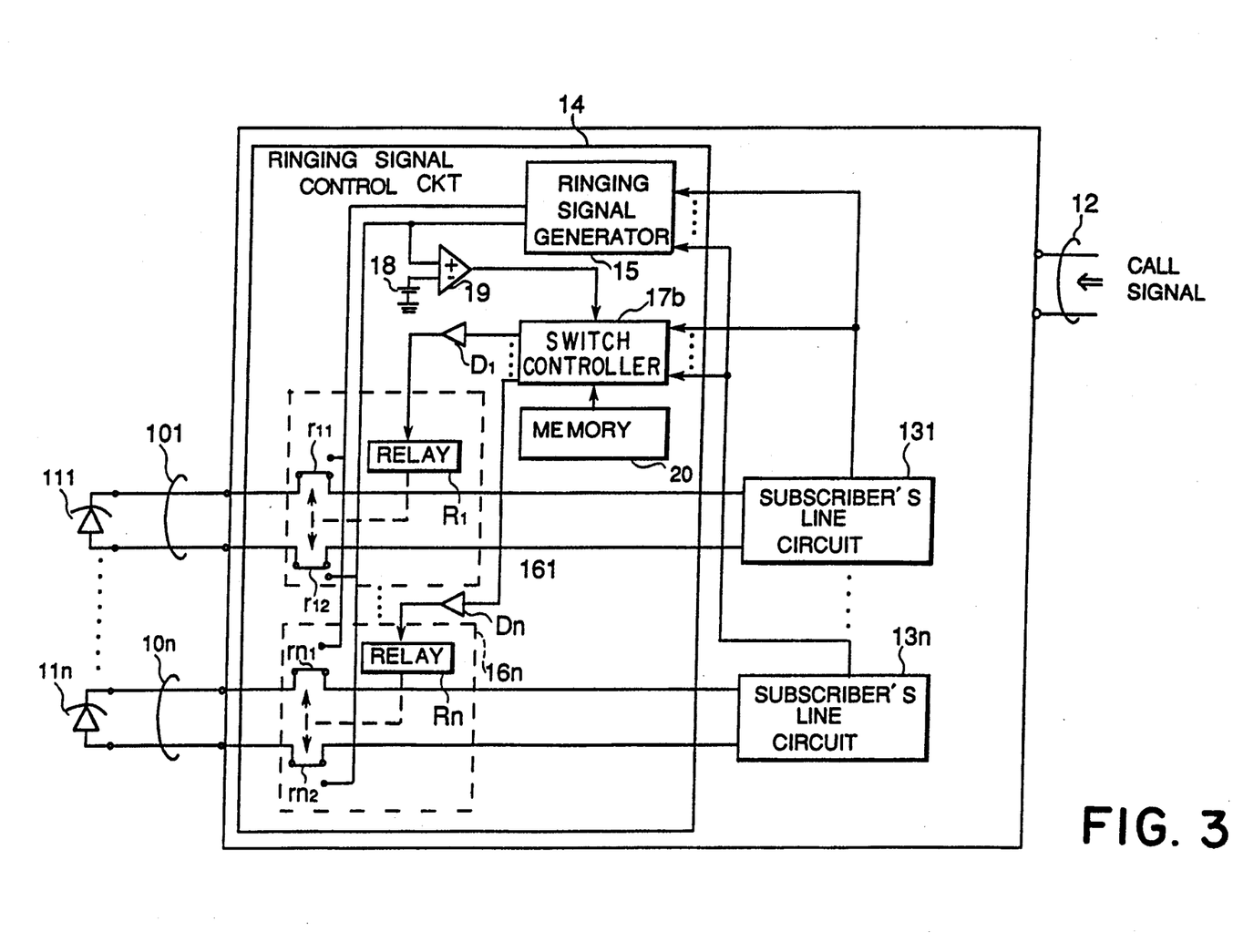
FIG. 3 is a block diagram view of an exchanging station accommodating a plurality of subscriber's lines and having a ringing signal control circuit according to an embodiment of this invention.

Referring to FIG. 3, there is shown an exchanging station using a ringing signal control circuit according to a preferred embodiment of the present invention.

The exchanging station in FIG. 3 is similar to that shown in FIG. 2, except for the function of a switch control circuit 17b and provision of a memory 20. Similar portions are identified by the same reference symbols in FIG. 2 and description thereto is omitted for the purpose of simplification of the description.

The memory 20 memorizes a plurality of time data signals for the subscriber's lines 101 to 10n, respectively. Each of the time data signals is representative of a voltage level transition time Td of the ringing signal from the predetermined voltage level or the reference voltage level Vr to the optimum or specific voltage level Vo which is determined by properties of each one of the subscriber's lines 101 to 10n and a corresponding one of the terminal sets 111 to 11n to be connected to the each one of the subscriber's lines.

The voltage level transition time Td is determined for each of the subscriber's lines by the following:

The ringing signal has the AC voltage V which is represented by:

$$V = A \sin(2\pi ft + a),$$

where, A represents an amplitude, f represents a fixed frequency, for example, 15 Hz, t represents an elapsed time, and a represents a constant.

If $V = Vr$ when $t = tr$, Vr is represented by:
$Vr = A \sin(2\pi f tr + a)$.

If a time duration is Td until the voltage level V varies from Vr to Vo, Vo is represented by:

$$Vo = A \sin\{2\pi f(tr + Td) + a\}.$$

Accordingly, if Vr and Vo are given, the time delay Td can be obtained.

The optimum voltage level Vo is measured for each of the subscriber's lines at installation of each of the subscriber's lines 101 to 10n and each of the terminal sets 111 to 11n connected to the subscriber's lines. The reference voltage Vr is previously selected. Accordingly, the time delay Td is obtained and is stored in the memory 20.

The switch control circuit 17b is coupled with the voltage comparator 19, the memory 20, and the switching elements 161 to 16n.

The control circuit 17b may be a microprocessor which executes the control operation.

Figure 4:
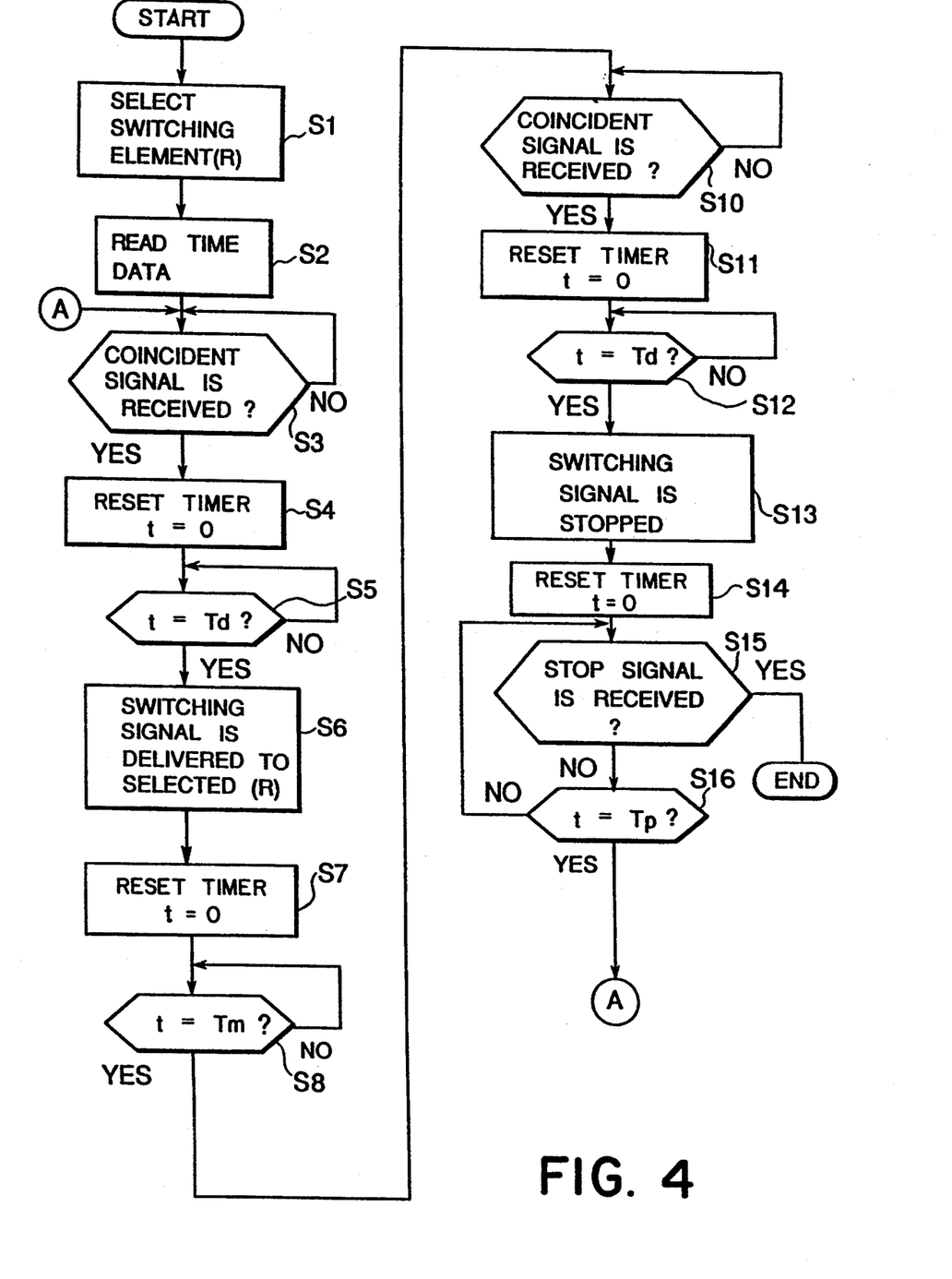
FIG. 4 is an operation flow chart of a switching control circuit shown in FIG. 3.
Figure 5:
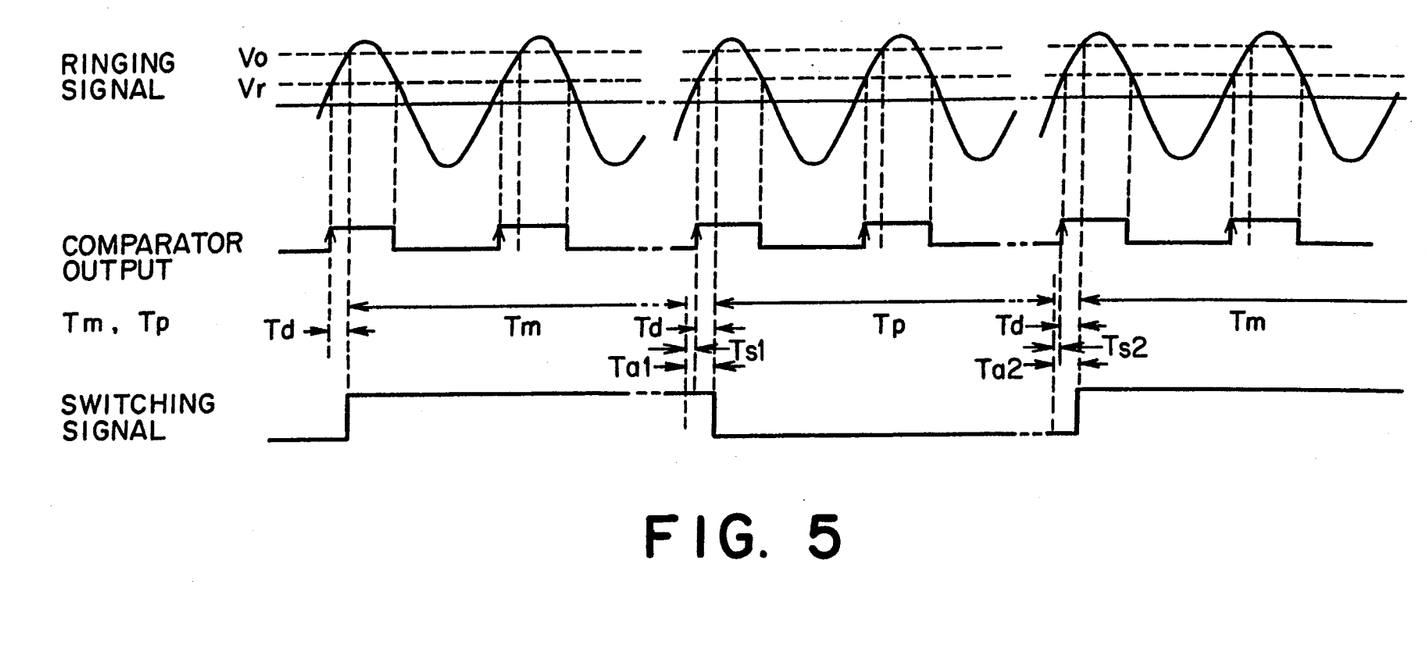
FIG. 5 shows voltage waveforms of various signals in the circuit shown in FIG. 3.

Now, referring to FIGS. 4 and 5, the control operation will be described below.

The switch control circuit 17b is responsive to the call detection signal from the particular subscriber's line circuit 13 and starts the control operation. At first, the switch control circuit 17b selects a particular one of the plurality of switching elements 161 to 16n which is corresponding to the particular subscriber's line 13 (step S1).

Then, the switch control circuit 17b reads a particular one of the plurality of time data signals corresponding to the particular subscriber's line 10 from the memory 20 (step S2), and decides reception of the coincident signal from the voltage comparator 19 (step S3). In response to reception of the coincident signal, the switch control circuit 17b produces the switching signal and delivers it to the selected switching element 16 at a time delayed by the voltage level transition time Td from reception of the coincident signal (steps S4 to S6). The time delay is measured by use of a timer. The timer is a combination of a clock and a counter counting a clock signal from the clock which are provided in the microprocessor.

The control operation further has a first operation mode and a second operation mode which are repeated one after another until receiving the stop signal from the particular subscriber's line circuit 13.

During the first operation mode, the switch control circuit 17b maintains the switching signal for at least a first predetermined time period or the make period Tm (steps 57 and 58), then, deciding reception of the coincident signal (Step S10) after the first predetermined time period Tm to stop the switching signal (Step S13) at a time delayed by the voltage level transition time Td from reception of the coincident signal (steps S11 and S12). The first operation mode has a first time duration which is the sum of the first predetermined time period Tm and a first additional time period Ta1. The first additional time period Ta1 is the sum of a first subordinate time duration Ts1 from an end of the first predetermined period Tm to a first reception of the coincident signal after the first predetermined period Tm and the voltage level transition time Td.

During the second operation mode, the switch control circuit 17b maintains stop of the switching signal for at least a second predetermined time period or the pause period Tp (steps S14 to S16), then, deciding reception of the coincident signal (step S3) after the second predetermined time period Tp to again produce the switching signal at a time delayed by the particular voltage level transition time Td from reception of the coincident signal (steps S4–S6). As it turned out, the second operation mode has a second time duration which is the sum of the second predetermined time period Tp and a second additional time period Ta2. The second additional time period Ta2 is the sum of a second subordinate time duration Ts2 from an end of the second predetermined period Tp to a first reception of the coincident signal after the second predetermined period Tp and the voltage level transition time Td.

The switch control circuit 17b also decides whether or not the particular subscriber's line circuit 13 produces the stop signal during the second predetermined time period Tp to stop the control operation in response to the stop signal (Step S15).

Thus, the switching signal is insured to be produced at the optimum voltage level Vo of the ringing signal to switch on or connect the particular subscriber's line 10 to the ringing signal generator 15. The switching signal is also stopped at the optimum voltage level Vo to switch off or disconnect the particular subscriber's line 10 from the ringing signal generator 15. Accordingly, the surge voltage is not caused on the particular subscriber's line at the switching of the ringing signal for the particular subscriber's line 10.

What is claimed is:

1. A ringing signal control circuit for controlling supply of a ringing signal to a subscriber's line extended to a terminal set when a subscriber's line circuit corresponding to said subscriber's line receives a call signal destined to said subscriber's line to produce a call detection signal in a telephone system, said ringing signal control circuit comprising:

ringing signal generating means connected to said subscriber's line circuit and responsive to said call detection signal for generating said ringing signal, said ringing signal having a maximum voltage level and a minimum voltage level and cyclically changing in voltage level between said maximum and said minimum voltage level;

reference voltage producing means for producing a reference voltage with a predetermined voltage level which is lower than said maximum voltage level but higher than said minimum level;

voltage comparing means connected to said ringing signal generating means and said reference voltage producing means for comparing said ringing signal with said reference voltage to produce a coincident signal when said ringing signal coincides with said reference voltage in voltage level;

switching means coupled to said subscriber's line, said subscriber's line circuit, and said ringing signal generating means and having a first switching mode in absence of a switching signal and a second switching mode in presence of said switching signal, and switching means connecting said subscriber's line to said subscriber's line circuit and disconnecting said ringing signal generating means from said subscriber's line in said first switching mode, said switching means being responsive to said switching signal and connecting said ringing signal generating means to said subscriber's line and disconnecting said subscriber's line circuit from said subscriber's line in said second switching mode;

memory means for memorizing a time data signal representative of a voltage level transition time of said ringing signal from said predetermined voltage level to a specific voltage level which is determined by properties of said subscriber's line and said terminal set to be connected to said subscriber's line; and switch control means coupled with said voltage comparing means, said memory means, and said switching means for controlling said switching means, said switch control means starting a control operation for controlling said switching means in response to said call detection signal from said subscriber's line circuit, said control operation comprising reading said time data signal from said memory means, deciding reception of said coincident signal from said voltage comparing means, and producing said switching signal at a time delayed by said voltage level transition time from reception of said coincident signal.

2. A ringing signal control circuit as claimed in claim 1, wherein said subscriber's line circuit produces a stop signal when detecting an off-hook signal from said terminal set through said subscriber's line, and wherein said control operation of said switch control means further has a first operation mode and a second operation mode which are repeated one after another until receiving said stop signal from said subscriber's line circuit, said switch control means, during said first operation mode, maintaining said switching signal for at least a first predetermined time period and deciding reception of said coincident signal after said first predetermined time period to stop said switching signal at a time delayed by said voltage level transition time from reception of said coincident signal, and said switch control means, during said second operation mode, maintaining stopping of said switching signal for at least a second predetermined time period and deciding reception of said coincident signal after said second predetermined time period to again produce said switching signal at a time delayed by said voltage level transition time from reception of said coincident signal, said switch control means deciding whether or not said subscriber's line circuit produces said stop signal during said second predetermined time period to stop the control operation in response to said stop signal.

3. An exchange station in a telecommunication system comprising a plurality of subscriber's lines extended to a plurality of terminal sets, respectively, subscriber's line circuits corresponding to said subscriber's lines, a particular one of said subscriber's line circuits producing a call detection signal when receiving a call signal destined to a corresponding one of said subscriber's lines as a particular subscriber's line, and a ringing signal control circuit for controlling supply of a ringing signal to said particular subscriber's line, said ringing signal control circuit comprising:

ringing signal generating means connected to each of said subscriber's line circuits and responsive to said call detection signal for generating said ringing signal, said ringing signal having a maximum voltage level and a minimum voltage level and cyclically changing in voltage level between said maximum and said minimum voltage level;

reference voltage producing means for producing a reference voltage with a predetermined voltage level which is lower than said maximum voltage level but higher than said minimum level;

voltage comparing means connected to said ringing signal generating means and said reference voltage producing means for comparing said ringing signal with said reference voltage to produce a coincident signal when said ringing signal coincides with said reference voltage in voltage level;

a plurality of switching means coupled to said plurality of subscriber's lines, said plurality of subscriber's line circuits, respectively, and said ringing signal generating means, each of said switching means having a first switching mode in absence of a switching signal and a second switching mode in presence of said switching signal, each of said switching means connecting a corresponding one of said subscriber's lines to a corresponding one of said subscriber's line circuits and disconnecting said ringing signal generating means from said corresponding subscriber's line in said first switching mode, each of said switching means being responsive to said switching signal delivered thereto and connecting said ringing signal generating means to said corresponding subscriber's line and disconnecting said corresponding subscriber's line circuit from said corresponding subscriber's line in said second switching mode;

memory means for memorizing a plurality of time data signals, each one of said time data signals being representative of a voltage level transition time of said ringing signal from said predetermined voltage level to a specific voltage level which is determined by properties of each one of said subscriber's lines and a corresponding one of said terminal sets to be connected to each one of said subscriber's lines; and switch control means coupled with said voltage comparing means, said memory means, and said plurality of switching means for controlling said switching means, said switch control means being responsive to said call detection signal and starting a control operation for controlling a particular one of said a plurality of switching means which is corresponding to said particular subscriber's line, said control operation comprising reading a particular one of said a plurality of time data signals corresponding to said particular subscriber's line from said memory means, deciding reception of said coincident signal from said voltage comparing means, and producing said switching signal to said particular switching means at a time delayed by said voltage level transition time of said particular time data signal from reception of said coincident signal.

4. An exchange station as claimed in claim 3, wherein said particular subscriber's line circuit produces a stop signal when detecting an off-hook signal from the corresponding terminal set through said particular subscriber's line, and wherein said control operation of said switch control means further has a first operation mode and a second operation mode which are repeated one after another until receiving said stop signal from said particular subscriber's line circuit, said switch control means, during said first operation mode, maintaining said switching signal for at least a first predetermined time period and deciding reception of said coincident signal after said first predetermined time period to stop said switching signal at a time delayed by said voltage level transition time of said particular time data signal from reception of said coincident signal, and said switch control means, during said second operation mode, maintaining stopping of said switching signal for at least a second predetermined time period and deciding reception of said coincident signal after said second predetermined time period to again produce said switching signal at a time delayed by the voltage level transition time of said particular time data signal from reception of said coincident signal, said switch control means deciding whether or not said particular subscriber's line circuit produces said stop signal during said second predetermined time period to stop the control operation in response to said stop signal.

5. A ringing signal control circuit for controlling supply of a ringing signal to a subscriber's line extended to a terminal set when a subscriber's line circuit corresponding to said subscribers line receives a call signal destined to said subscriber's line to produce a call detection signal in a telephone system, said ringing signal control circuit comprising;

ringing signal generating means connected to said subscriber's line circuit and responsive to said call detection signal for generating said ringing signal, said ringing signal having a maximum voltage level and a minimum voltage level and cyclically changing in voltage level between said maximum and said minimum voltage level;

reference voltage producing means for producing a reference voltage with a predetermined voltage level which is lower than said maximum voltage level but higher than said minimum level;

voltage comparing means connected to said ringing signal generating means and said reference voltage producing means for comparing said ringing signal with said reference voltage to produce a coincident signal when said ringing signal coincides with said reference voltage in voltage level;

switching means coupled to said subscriber's line, said subscriber's line circuit, and said ringing signal generating means and having a first switching mode in absence of a switching signal and a second switching mode in presence of said switching signal, said switching means connecting said subscriber's line to said subscriber's circuit and disconnecting said ringing signal generating means from said subscriber's line in said first switching mode, said switching means being responsive to said switching signal and connecting said ringing signal generating means to said subscriber's line and disconnecting said subscriber's line circuit from said subscriber's line in said second switching mode;

memory means for memorizing a time data signal representative of a voltage level transition time of said ringing signal from said predetermined voltage level to a specific voltage level which is determined by properties of said subscriber's line and said terminal set to be connected to said subscriber's line; and switch control means coupled with said voltage comparing means, said memory means, and said switching means for controlling said switching means, said switch control means starting a control operation for controlling said switching means in response to said call detection signal from said subscriber's line circuit, said control operation comprising:

a first operation mode comprising steps of reading said time data signal from said memory means in response to said call detecting signal, deciding, as a first reception, reception of said coincident signal from said voltage comparing means, and producing said switching signal at a time delayed by said voltage level transition time from said first reception of said coincident signal; and a second operation mode starting in response to production of said switching signal and comprising steps of maintaining production of said switching signal, deciding, as a second reception, reception of said coincident signal after elapse of a first predetermined time period from said starting of said second operation mode, and stopping said switching signal at a time delayed by said voltage level transition time from said second reception of said coincident signal.

6. A ringing signal control circuit as claimed in claim 5, wherein said subscriber's line circuit produces a stop signal when detecting an off-hook signal from said terminal set through said subscriber's line, and wherein said control operation of said switch control means further comprises a third operation mode which starts in response to stop of said switching signal and comprising steps of maintaining stopping of said switching signal, deciding, as a third reception, reception of said coincident signal after elapse of a second predetermined time period from starting of said third operation mode, and again producing said switching signal at a time delayed by said voltage level transition time from said third reception of said coincident signal to thereby again start said second operation mode, said switch control means thereafter repeating said second and said third operation modes one after another, said switch control means deciding whether or not said subscriber's line circuit produces said stop signal during said second predetermined time period to stop the control operation in response to said stop signal.

7. An exchange station in a telecommunication system comprising a plurality of subscriber's lines extended to a plurality of terminal sets, respectively, subscriber's line circuits corresponding to said subscriber's lines, a particular one of said subscriber's line circuits producing a call detection signal when receiving a call signal destined to a corresponding one of said subscriber's lines as a particular subscriber's line, and a ringing signal control circuit for controlling supply of a ringing signal to said particular subscriber's line, said ringing signal control circuit comprising:

ringing signal generating means connected to each of said subscriber's line circuits and responsive to said call detection signal for generating said ringing signal, said ringing signal having a maximum voltage level and a minimum voltage level and cyclically changing in voltage level between said maximum and said minimum voltage level;

reference voltage producing means for producing a reference voltage with a predetermined voltage level which is lower than said maximum voltage level but higher than said minimum level;

voltage comparing means connected to said ringing signal generating means and said reference voltage producing means for comparing said ringing signal with said reference voltage to produce a coincident signal when said ringing signal coincides with said reference voltage in voltage level;

a plurality of switching means coupled to said plurality of subscriber's lines, said plurality of subscriber's line circuits, respectively, and said ringing signal generating means, each of said switching means having a first switching mode in absence of a switching signal and a second switching mode in presence of said switching signal, each of said switching means connecting a corresponding one of said subscriber's lines to a corresponding one of said subscriber's line circuits and disconnecting said ringing signal generating means from said corresponding subscriber's line in said first switching mode, each of said switching means being responsive to said switching signal delivered thereto and connecting said ringing signal generating means to said corresponding subscriber's line and disconnecting said corresponding subscriber's line circuit from said corresponding subscriber's line in said second switching mode;

memory means for memorizing a plurality of time data signals, each one of said time data signals being representative of a voltage level transition time of said ringing signal from said predetermined voltage level to a specific voltage level which is determined by properties of each one of said subscriber's lines and a corresponding one of said terminals set to be connected to said each one of said subscriber's lines; and switch control means coupled with said voltage comparing means, said memory means, and said plurality of switching means for controlling said switching means, said switch control means being responsive to said call detection signal and starting control operation for controlling a particular one of said plurality of switching means which is corresponding to said particular subscriber's line, said control operation comprising:

a first operation mode comprising steps of reading a particular one of said a plurality of time data signals corresponding to said particular subscriber's line from said memory means in response to said call detecting signal, deciding, as a first reception, reception of said coincident signal from said voltage comparing means, and producing said switching signal at a time delayed by said voltage level transition time of said particular time data signal from said first reception of said coincident signal.

8. An exchange station as claimed in claim 7, wherein said particular subscriber's line circuit produces a stop signal when detecting an off-hook signal from the corresponding terminal set through said particular subscriber's line, and wherein said control operation of said switch control means further comprises a third operation mode which starts in response to stop of said switching signal and comprising steps of maintaining stopping of said switching signal, deciding, as a third reception, reception of said coincident signal after elapse of a second predetermined time period from starting of said third operation mode, and again producing said switching signal at a time delayed by said voltage level transition time from said third reception of said coincident signal to thereby again start said second operation mode, said switch control means thereafter repeating said second and said third operation modes one after another, said switch control means deciding whether or not said particular subscriber's line circuit produces said stop signal during said second predetermined time period to stop the control operation in response to said stop signal.

* * * * *